United States Patent
Lipman et al.

(10) Patent No.: US 9,515,942 B2
(45) Date of Patent: *Dec. 6, 2016

(54) METHOD AND SYSTEM FOR ACCESS POINT CONGESTION DETECTION AND REDUCTION

(71) Applicant: Intel Corporation, Santa Clara, CA (US)

(72) Inventors: Justin Lipman, Shanghai (CN); Xiaodong Chen, Shanghai (CN)

(73) Assignee: Intel Corporation, Santa Clara, CA (US)

(*) Notice: Subject to any disclaimer, the term of this patent is extended or adjusted under 35 U.S.C. 154(b) by 176 days.

This patent is subject to a terminal disclaimer.

(21) Appl. No.: 14/100,848

(22) Filed: Dec. 9, 2013

(65) Prior Publication Data

US 2014/0101332 A1    Apr. 10, 2014

Related U.S. Application Data

(63) Continuation of application No. 13/322,324, filed on Mar. 15, 2012, now Pat. No. 8,606,956.

(51) Int. Cl.
*G06F 15/16* (2006.01)
*H04L 12/841* (2013.01)
*H04L 12/825* (2013.01)

(52) U.S. Cl.
CPC ............ *H04L 47/283* (2013.01); *H04L 47/25* (2013.01)

(58) Field of Classification Search
CPC ..................................... H04L 47/283
USPC ............................... 709/235, 203
See application file for complete search history.

(56) References Cited

U.S. PATENT DOCUMENTS

| 1,023,064 | A | 4/1912 | Bechtold |
| 5,400,329 | A | 3/1995 | Tokura et al. |
| 7,146,174 | B2 * | 12/2006 | Gardner .................. G10L 19/22 370/468 |
| 7,512,066 | B2 | 3/2009 | Santos et al. |

(Continued)

FOREIGN PATENT DOCUMENTS

| CN | 1400774 | 3/2003 |
| CN | 1400774 A | 3/2003 |

(Continued)

OTHER PUBLICATIONS

Allowance Decision received for Taiwan Application No. 100134380, mailed Apr. 28, 2014, 2 pages.

(Continued)

*Primary Examiner* — Duyen Doan
(74) *Attorney, Agent, or Firm* — Barnes & Thornburg LLP

(57) ABSTRACT

A method and system for detecting and reducing data transfer congestion in a wireless access point includes determining a round-trip-time value for an internet control message protocol (ICMP) packet transmitted from a source computing device to a first computing device of a plurality of computing devices via the wireless access point. A data rate for data transmissions from the source computing device is increased to a value no greater than a peak data rate value if the round-trip-time is less than a first threshold value. The data rate is decreased if the round-trip-time value is greater than a second threshold value. Additionally, the peak data rate value may also be decreased if the round-trip-time value is greater than the second threshold value.

23 Claims, 5 Drawing Sheets

(56) References Cited

U.S. PATENT DOCUMENTS

| | | | |
|---|---|---|---|
| 7,532,642 B1 | 5/2009 | Peacock | |
| 7,688,731 B2 | 3/2010 | Haumont et al. | |
| 7,796,517 B2 | 9/2010 | Chen et al. | |
| 8,379,535 B2 | 2/2013 | Chen et al. | |
| 8,462,778 B2 | 6/2013 | Henocq et al. | |
| 8,606,956 B2* | 12/2013 | Lipman | H04L 47/283 709/231 |
| 8,769,594 B2* | 7/2014 | Perlman | A63F 13/12 463/42 |
| 2002/0099854 A1 | 7/2002 | Jorgensen | |
| 2002/0150048 A1 | 10/2002 | Ha et al. | |
| 2003/0041165 A1* | 2/2003 | Spencer | H04L 12/1827 709/233 |
| 2003/0191841 A1 | 10/2003 | DeFerranti et al. | |
| 2004/0003105 A1* | 1/2004 | Berzosa | H04L 29/06 709/232 |
| 2004/0146016 A1* | 7/2004 | Kim | H04W 28/22 370/328 |
| 2005/0198111 A1 | 9/2005 | Lamb et al. | |
| 2005/0198350 A1* | 9/2005 | Tan | H04L 69/163 709/232 |
| 2006/0029037 A1 | 2/2006 | Chen | |
| 2006/0171313 A1 | 8/2006 | Shimonishi | |
| 2006/0217234 A1 | 9/2006 | Rodgers | |
| 2007/0076625 A1 | 4/2007 | Tahara et al. | |
| 2007/0076626 A1 | 4/2007 | Wise et al. | |
| 2008/0298248 A1* | 12/2008 | Roeck | H04L 47/10 370/237 |
| 2010/0165840 A1 | 7/2010 | Khan et al. | |
| 2011/0002236 A1 | 1/2011 | Chen et al. | |
| 2011/0170410 A1 | 7/2011 | Zhao et al. | |
| 2011/0299399 A1* | 12/2011 | Egan | H04L 47/10 370/237 |
| 2013/0212251 A1 | 8/2013 | Lipman et al. | |

FOREIGN PATENT DOCUMENTS

| | | |
|---|---|---|
| CN | 1968251 | 5/2007 |
| JP | 10023064 A | 1/1998 |
| JP | 2005198111 A | 7/2005 |
| JP | 2006217234 A | 8/2006 |
| JP | 2009089416 A | 4/2009 |
| WO | 2007036046 | 4/2007 |
| WO | 2007036046 A1 | 4/2007 |
| WO | 2012037707 A1 | 3/2012 |

OTHER PUBLICATIONS

Extended European Search Report received for European Application No. 10854845.4, mailed Apr. 3, 2014, 8 pages.

Official Communication received for European Application No. 10854845.4, mailed Apr. 24, 2014, 1 page.

Official Communication received for Australian Patent App. No. 2010361098, mailed on Jan. 22, 2014, 3 pages.

Office Action received for Taiwanese Patent Application No. 100134380, mailed Oct. 24, 2013, 8 pages of Taiwanese Office Action and 7 pages of unofficial English translation.

Decision for Grant received for Japanese Patent Application No. 2012-534517, mailed Jul. 30, 2013, 3 pages of Japanese Decision for Grant.

International Preliminary Report on Patentability received for International Patent Application No. PCT/CN2010/001471, mailed Apr. 4, 2013, 7 pages.

Office Action received for Japanese Patent Application No. 2012-534517, mailed Apr. 2, 2013, 2 pages of Japanese Office Action and 2 pages of unofficial English translation.

Office Action received for Korean Application No. 10-2011-7031262, mailed Jan. 30, 2013, 3 pages of Korean Office Action and 2 pages of unofficial English translation.

International Search Report received for International Patent Application No. PCT/CN2010/001471, mailed Jun. 30, 2011, 11 pages.

Chinese Notification of the First Office Action, Chinese Patent Application No. 201080026059.8, Feb. 28, 2015, 9 pages.

* cited by examiner

METHOD AND SYSTEM FOR ACCESS POINT CONGESTION DETECTION AND REDUCTION

CROSS-REFERENCE TO RELATED APPLICATION

This application is a continuation application of U.S. application Ser. No. 13/322,324, entitled "Method and System for Access Point Congestion Detection and Reduction," which was filed on Mar. 15, 2012.

BACKGROUND

Collaboration computing environments often rely on data transfer from a source computing device to multiple destination or sink computing devices. For example, in educational environments, "classroom collaboration" relies on the transfer of files, video, and other data from the teacher's computing device to each student's computing device. Typically, multicast, broadcast, or other one-to-many data transmissions are used to effect such data transfer.

Unlike multicast or broadcast transmissions, unicast transmissions are one-to-one data transmissions (i.e., from a single source computing device to a single destination or sink computing device). Some communication devices and standards are optimized for or otherwise provide better service and/or reliability with unicast transmissions compared to multicast or broadcast transmissions. For example, some access points (e.g., a wired or wireless router, switch or hub) are optimized for routing unicast transmissions. Conversely, in a multicast transmission, the access point can become a "bottleneck" of the local area network (LAN) because the access point must transmit the data received from the source computing device (usually via a unicast transmission) to each sink computing device on the local area network. As such, the outgoing data rate from the access point is typically significantly lower than the incoming data rate from the source computing device. This disparity in data rates can cause the data queues of the access point to overflow resulting in lost data and delayed transmissions. These difficulties may be compounded in some network environments in which unicast transmissions are given a higher priority or quality of service over multicast transmissions. Further, many access point devices have default multicast settings that are not optimal, which can result in additional data transfer congestion difficulties.

BRIEF DESCRIPTION OF THE DRAWINGS

The systems, devices, and methods described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
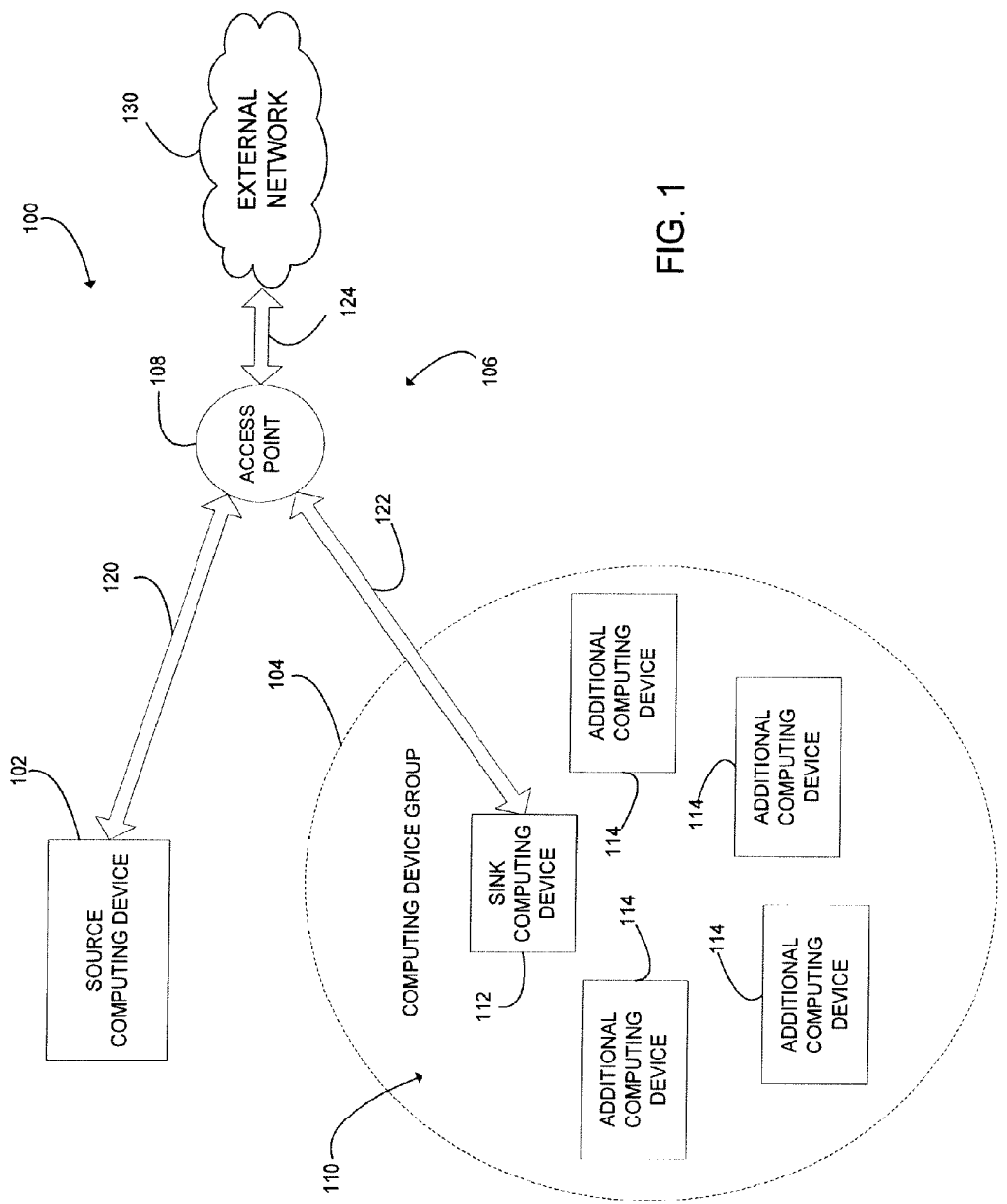
FIG. 1 is a simplified block diagram of one embodiment of a system for detecting and reducing data transfer congestion in an access point of a network.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices may be set forth in order to provide a more thorough understanding of the present disclosure. It will be appreciated, however, by one skilled in the art that embodiments of the disclosure may be practiced without such specific details. In other instances, control structures, gate level circuits and full software instruction sequences may have not been shown in detail in order not to obscure the disclosure. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure may be implemented in hardware, firmware, software, or any combination thereof. Embodiments of the disclosure implemented in a computer system may include one or more bus-based interconnects between components and/or one or more point-to-point interconnects between components. Embodiments of the invention may also be implemented as instructions stored on a machine-readable, tangible medium, which may be read and executed by one or more processors. A machine-readable, tangible medium may include any tangible mechanism for storing or transmitting information in a form readable by a machine (e.g., a computing device). For example, a machine-readable, tangible medium may include read only memory (ROM); random access memory (RAM); magnetic disk storage media; optical storage media; flash memory devices; and other tangible mediums.

Referring now to FIG. 1, a system 100 for detecting and reducing data transfer congestion includes a source or server computing device 102 and a receiving or client computing device group 104. The computing devices 102, 104 are communicatively coupled to each other over a network 106 via an access point 108. The source computing device 102 may be embodied as any type of computing device capable of performing the functions described herein. For example, in some embodiments, the source computing device 102 may be embodied as a desktop computer, a laptop computer, a mobile internet device (MID), or other network-enabled computing device.

The computing device group 104 includes a plurality of computing devices 110, which includes one or more sink computing device(s) 112 and additional computing devices 114. The one or more sink computing device(s) 112 is selected from the computing device 110 to receive internet control message protocol (ICMP) packets from the source computing device 102 to measure the amount of congestion of the network 106 (i.e., of the access point 108) as discussed in more detail below. The sink computing device(s) 112 may be selected randomly or selected based on some criteria such as a signal quality measurement.

Similar to the source computing device 102, each of the computing devices 110 may be embodied as any type of computing device capable of performing the functions described herein. For example, each of the computing devices 110 may be embodied as a desktop computer, a laptop computer, a mobile internet device (MID), or other network-enabled computing device.

The access point 108 facilitates communication between the computing devices 102, 110. The access point 108 may be embodied as any type of wired or wireless network communication routing devices such as a wired or wireless router, switch, hub, or other network communication device capable of communicatively coupling the computing devices 102, 110. In some embodiments, the access point 108 is also communicatively coupled to an external network 130 via a communication link 124. The network 130 may be embodied as any type of wired and/or wireless network such as a local area network, a wide area network, a publicly available global network (e.g., the Internet), or other network. Similarly, the communication link 124 may be embodied as any type of wired or wireless communication link capable of facilitating communication between the access point 108 and the external network 130 such as, for example, any number of wireless or physical connections, wires, cables, and/or other interconnecting links or paths. Additionally, the network 130 may include any number of additional devices, such as routers, switches, intervening computers, and the like, to facilitate communication between the computing devices 102, 110 and remote computing devices.

In some embodiments, the source computing device 102 and the computing device group 104 are located in a single room or are otherwise local to each other. For example, in one particular embodiment, the system 100 is incorporated in a classroom. In such embodiments, the source computing device 102 may be embodied as the teacher's or instructor's computing device and the computing devices 110 may be embodied as student computing devices. Of course, the system 100 may also be used in other environments or implementations in which one-to-many data transmissions are required.

In use, the source computing device 102 (or other component of the system 100) is configured to monitor the data traffic congestion of the access point 108, and the network 106, and adjust its data rate accordingly. To do so, the source computing device 102 measures a round-trip-time value for transmitting an internet control message protocol (ICMP) packet to the sink computing device(s) 112 and receiving a response from the sink computing device(s) 112 in response to the internet control message protocol (ICMP) packet. It should be appreciated that although the source computing device 102 is described as performing the network congestion monitoring function, other components of the system 100 may perform such monitoring tasks in other embodiments. For example, in other embodiments, one of the computing devices 110 may perform the network congestion monitoring and report the network congestion level to the other devices of the system 100 (including the source computing device 102).

Based on the round-trip-time value, the source computing device 102 is configured to increase its data rate, maintain its data rate, or decrease its data rate. For example, if the round-trip-time value is less than a predetermined threshold value, the source computing device 102 determines that the access point 108 is not overly congested. In response, the source computing device 102 increases the data rate. The data rate may be increased linearly, exponentially, or according to some other equation or algorithm. However, if the round-trip-time value is greater than a predetermined threshold value, the source computing device 102 determines that the access point 108 is congested. In response, the source computing device 102 decreases the peak data rate. Additionally, the source computing device 102 decreases the current data rate based on or in dependence on the peak data rate. For example, as discussed in more detail below, the data rate may be decreased according to a midpoint calculation formula such that the new starting data rate is increased over time toward the peak data rate. The peak data rate may be decreased by a fixed amount or based on a percentage amount such as, for example, a ten percent decrease. In this way, the source computing device 102 searches for the highest available data rate that does not cause over congestion of the access point 108 while not continuously "bumping" against the peak data rate. That is, both the starting data rate and the peak data rate are adjusted toward the local "optimum" data rate over time as discussed in more detail in regard to FIG. 5 below.

Figure 2:
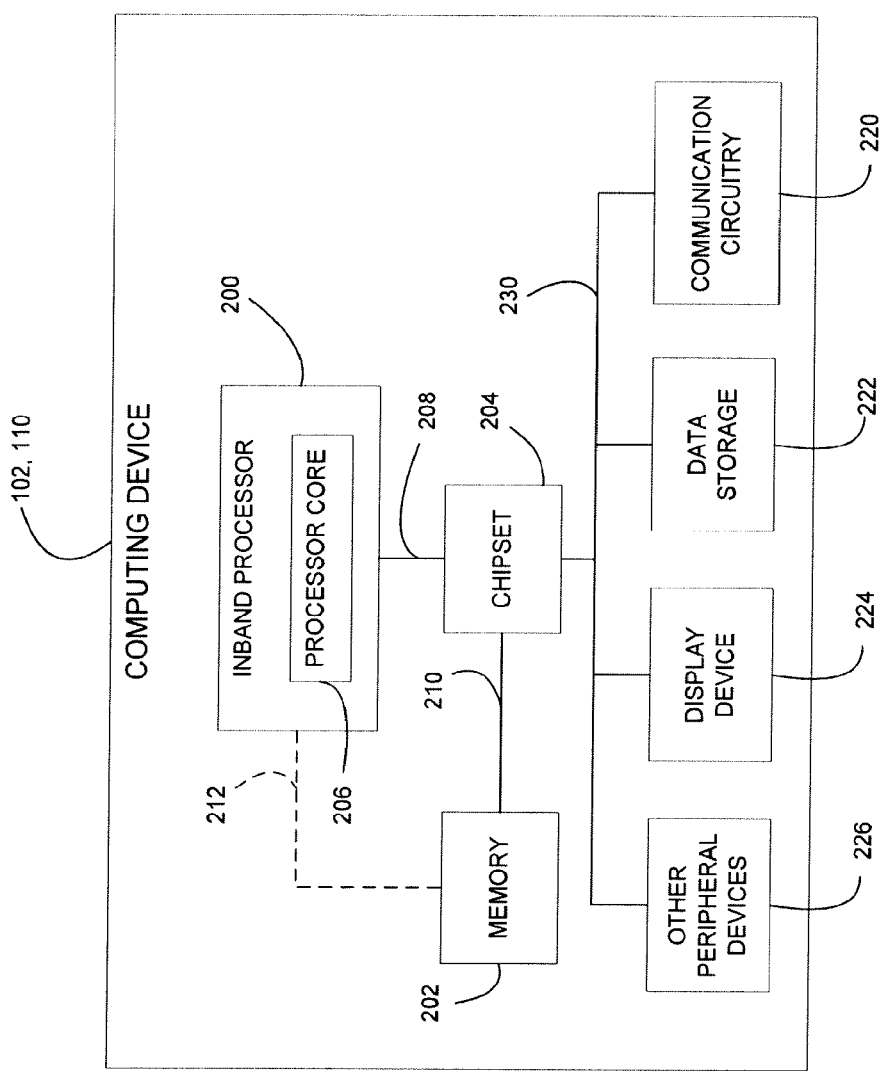
FIG. 2 is a simplified block diagram of one embodiment of a computing device of the system of FIG. 1.

Referring now to FIG. 2, in one embodiment, each of the computing devices 102, 110 includes a processor 200, a chipset 204, and memory 202. The computing devices 102, 110 may be embodied as any type of computing devices capable of performing the respective functions described herein. For example, as discussed above, the computing devices 102, 110 may be embodied as desktop computers, laptop computers, mobile internet devices (MID), or other network-enabled computing devices.

The processor 200 is illustratively embodied as a single core processor having a processor core 206. However, in other embodiments, the processor 200 may be embodied as a multi-core processor having multiple processor cores 206. Additionally, the computing devices 102, 110 may include additional processors 200 having one or more processor cores 206. The processor 200 is communicatively coupled to the chipset 204 via a number of signal paths 208. The signal paths 208 may be embodied as any type of signal paths capable of facilitating communication between the processor 200 and the chipset 204. For example, the signal paths 208 may be embodied as any number of bus paths, printed circuit board traces, wires, vias, intervening devices, and/or other interconnects.

The memory 202 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), and/or other volatile memory devices. Additionally, although only a single memory device 202 is illustrated in FIG. 2, in other embodiments, the computing devices 102, 110 may include additional memory devices.

The chipset 204 may include a memory controller hub (MCH) or northbridge, an input/output controller hub (ICH) or southbridge, and a firmware device. In such embodiments, the firmware device may be embodied as a memory storage device for storing Basic Input/Output System (BIOS) data and/or instructions and/or other information. The chipset 204 is communicatively coupled to the memory 202 via a number of signal paths 210. Similar to the signal paths 208, the signal paths 210 may be embodied as any type of signal paths capable of facilitating communication between the chipset 204 and the memory device 202 such as, for example, any number of bus paths, printed circuit board traces, wires, vias, intervening devices, and/or other interconnects.

In other embodiments, the chipset 204 may be embodied as a platform controller hub (PCH). In such embodiments, the memory controller hub (MCH) may be incorporated in or otherwise associated with the processor 200. Additionally, in such embodiments, the memory device 202 may be communicatively coupled to the processor 200, rather than the chipset 204 (i.e., rather than the platform controller hub), via a number of signal paths 212. Similar to the signal paths 208, the signal paths 212 may be embodied as any type of signal paths capable of facilitating communication between the memory device 202 and the processor 200 such as, for example, any number of bus paths, printed circuit board traces, wires, vias, intervening devices, and/or other interconnects.

The computing devices 102, 110 also include communication circuitry 220 for communicating with each other over the network 106. The communication circuitry 220 may be embodied as any number of devices and circuitry for enabling communications between the computing devices 102, 110. For example, the communication circuitry 220 may be embodied as one or more wired or wireless network interface cards (NICs) or other network communication cards, modules, or circuits for communicating with other computing devices 102, 110 via the access point 108.

The computing devices 102, 110 may also include additional peripheral devices such as a data storage 222, a display device 224, and other peripheral devices 226. Each of the communication circuitry 220, the data storage 222, the display device 224, and other peripheral devices 226 is communicatively coupled to the chipset 204 via signal paths 230. Again, similar to the signal paths 208, the signal paths 230 may be embodied as any type of signal paths capable of facilitating communication between the chipset 204 and the communication circuitry 220, the data storage 222, the display device 224, and other peripheral devices 226 such as, for example, any number of bus paths, printed circuit board traces, wires, vias, intervening devices, and/or other interconnects.

The data storage device(s) 222 may be embodied as any type of devices configured for the short-term or long-term storage of data such as, for example, memory devices and circuits, memory cards, hard disk drives, solid-state drive, or other data storage devices. The display device 224 may be embodied as any type of display device for displaying data to a user of the computing devices 102, 110 such as, for example, a liquid crystal display (LCD), a cathode-ray tube (CRT) display, a light emitting diode (LED) display, or other display device. The peripheral devices 226 may include any number of additional peripheral devices including input devices, output devices, and other interface devices. For example, the peripheral devices 226 may include a keyboard and/or mouse for supplying an input to the computing device 102, 110. The particular number and type of devices included in the peripheral devices 226 may depend upon, for example, the intended use of the computing device 102, 110.

Figure 3:
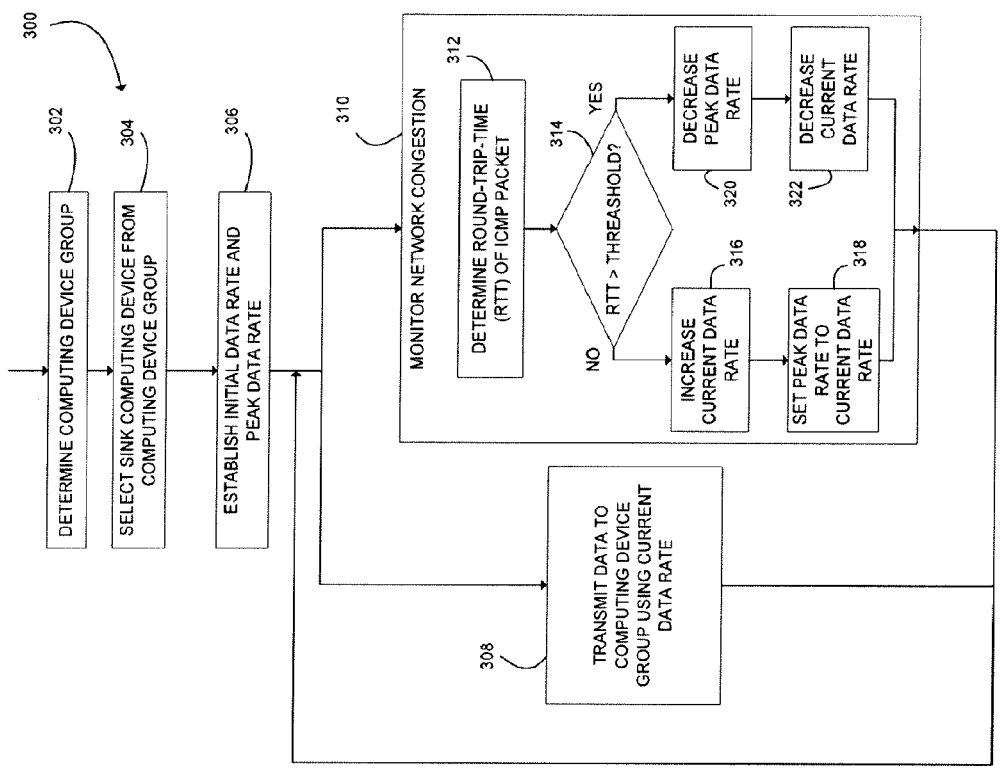
FIG. 3 is a simplified flow diagram of one embodiment of a method for detecting and reducing data transfer congestion in the access point of the network of FIG. 1.

Referring now to FIG. 3, a method 300 for detecting and reducing data transfer congestion in the access point 108 of the system 100 may be executed by the source computing device 102. The method 300 begins with block 302 in which the computing device group 104 is determined by the source computing device 102. To do so, each of the computing devices 110 may register with the computing device 102 such that the source computing device 102 has access to the network address (e.g., the MAC address) of each computing device 110. Such registration may be performed manually or automatically. For example, in some embodiments, the network addresses of the computing devices 110 may be manually entered into the source computing device 102 and stored therein (e.g., in memory 202 and/or data storage 222). Alternatively, the source computing device 102 may interrogate or otherwise request each computing device 110 to transmit its network address to the source computing device 102. Regardless, each of the computing devices 110 is registered with the source computing device 102 in block 302.

In block 304, the source computing device 102 selects one or more of the computing devices 110 as the sink computing device(s) 112. As discussed above, the sink computing device 112 is the selected computing device to which the source computing device 102 will direct the internet control message protocol (ICMP) packet to determine the current data transfer congestion of the access point 108 based on the round-trip-time value as discussed in more detail below. The source computing device 102 may select the sink computing device 112 from the computing devices 110 using any suitable method or algorithm. For example, in one embodiment, the source computing device 102 may randomly select the sink computing device 112 from the computing devices 110 using a suitable random generating algorithm. Alternatively, the source computing device 102 may select the sink computing device 112 based on some criteria or data associated with each computing device 110. For example, in one embodiment, the source computing device 102 is configured to select the sink computing device 112 from the computing devices 110 based on a received signal strength indication (RSSI) measurement of each computing device 110, a signal-to-noise ratio (SNR) measurement of each computing device 110, or some other measurement related to communication quality or the like. In such embodiments, the computing devices 110 may be configured to transmit such measurement criteria to the source computing device during registration of the computing device group in block 302. Alternatively, such measurements may be determined manually for each computing device 110. In such embodiments, the sink computing device 112 may be manually selected based on such measurements.

The source computing device 102 may select the sink computing device 112 once or multiple times. For example, in some embodiments, the source computing device 102 may be configured to reselect the sink computing device 112 for every computing session or periodically (e.g., hourly, daily, weekly, etcetera). Additionally, in some embodiments, the source computing device 102 may be configured to reselect the sink computing device 112 from the computing devices 110 based on some criteria or measurement. For example, the source computing device 102 may reselect a sink computing device 112 when the RSSI, SNR, or other signal measurement increases above some predetermined threshold; when the rate of retransmission requests received from the sink computing device 112 decreases below some predetermined threshold; or the like. In this way, the source computing device 102 may ensure that the computing device 110 having the lowest, or one of the lowest, RSSI, SNR or other signal measurement is selected as the sink computing device 112. Additionally, the source computing device 102 may select a single or multiple sink computing devices 112 from the computing devices 110. In embodiments wherein multiple sink computing devices 112 are selected, the source computing device 102 is configured to transmit internet control message protocol (ICMP) packets to each of the sink computing devices 112 to determine the round-trip-time value.

In block 306, the source computing device 102 establishes an initial or starting data rate and a peak or maximum data rate. To do so, the source computing device 102 may simply set the initial and peak data rates to a predetermined amount. The initial data rate is the data rate at which the source computing device 102 will begin transmitting (e.g., multi-casting) data to the computing devices 110. The peak data rate is used to track the maximum data rate prior to data transfer congestion and to determine a new data rate as discussed below.

After the initial data rate and peak data rate have been established or otherwise determined in block 306, the source computing device 102 begins transmitting data to the computing devices 110 in block 308 using the current data rate (which is initially equal to the starting data rate). Contemporaneously with the transmitting of data to the computing devices 110 in block 308, the source computing device 102 is configured to monitor network congestion in block 310. The source computing device 102 may monitor the network congestion (i.e., the data transfer congestion of the access point 108) periodically, at random intervals, or substantially constantly. To do so, the source computing device 102 determines the round-trip-time value for an internet control message protocol (ICMP) packet transmitted to the sink computing device(s) 112 in block 312. That is, the source computing device 102 transmits the internet control message protocol (ICMP) packet to the sink computing device(s) 112 and measures the elapsed time until receiving a response from the sink computing device(s) 112 in response to the control message protocol (ICMP) packet. The round-trip-time value is equal to the elapsed time. However, in some embodiments, the round-trip-time value may be set to a maximum value should no response from the sink computing device(s) 112 be received within a predetermined maximum time period.

It should be appreciated that the round-trip-time value is a measure of the data transfer congestion of the access point 108 and/or other components of the system 100. As such, higher values of the round-trip-time value are indicative of a higher amount of congestion. In block 314, the source computing device 102 determines whether the measured round-trip-time value is greater than a threshold value. The threshold value may be predetermined and/or adjusted over time. If the round-trip-time value is less than the threshold value, the current data rate is increased in block 316. That is, the data rate used by the source computing device 102 to transmit data to the computing devices 110 in block 308 is increased in block 316. The current data rate may be increased linearly or non-linearly with respect to time. For example, in some embodiments, the data rate may be increased by a predetermined, fixed amount. Alternatively, the data rate may be exponentially increased over time. Additionally, in block 318, the peak data rate is set to the current data rate. In this way, the peak data rate tracks the current data rate during light data traffic congestion.

Referring back to block 314, if the round-trip-time value is greater than the threshold value, the peak data rate is decreased in block 320. To do so, the peak data rate may be decreased by a predetermined, fixed amount, a percentage amount, or other amount. In one particular embodiment, the peak data rate is decreased by about ten percent in block 320 (i.e., the new peak data rate is ninety percent of the current peak data rate). In some embodiments, as discussed in more detail below in regard to FIG. 4, the peak data rate is decreased only during a predetermined period of time. As such, after some amount of time, the peak data rate may no longer be decreased such that the source computing device 102 may again search for a new local maximum data rate.

Figure 5:
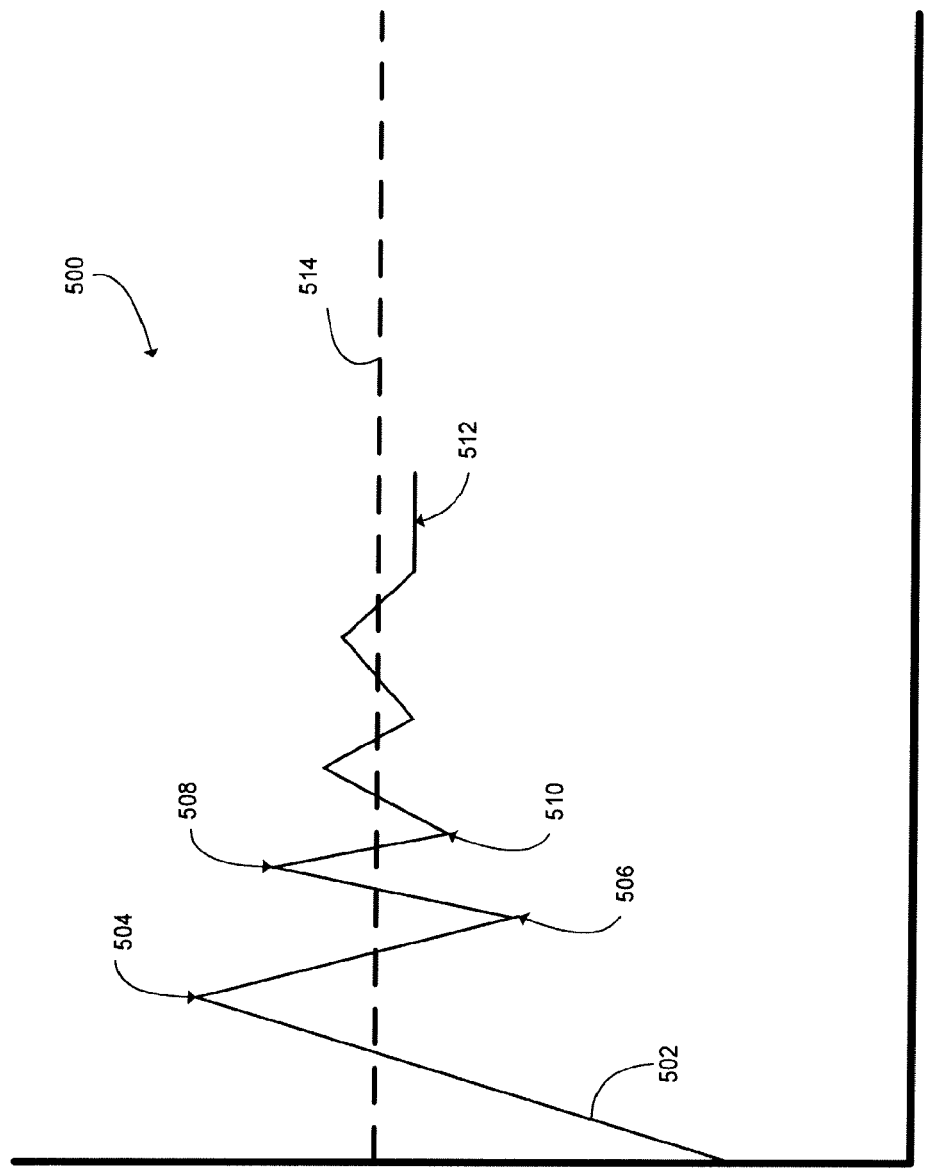
FIG. 5 is a graph of the data rate trend of a source computing device using the congestion detection and reducing methods of FIGS. 3 and 4.

In block 322, the current data rate is also decreased. In some embodiments, the current data rate may be decreased by a fixed amount, a percentage value, or the like. In one particular embodiment, the current data rate is decreased to a midpoint data rate value between a previous starting value and the current peak data rate. To do so, the source computing device 102 may calculate a new midpoint data rate by summing the current peak data rate and a previously determined midpoint data rate, which may initially be set to zero or another initial value. The sum of the peak data rate and previous midpoint data rate is divided by two to determine the new midpoint data rate. The current data rate is set to the newly determined midpoint data rate, which is subsequently used as the previous midpoint data rate in subsequent calculations. In this way, the current data rate is decreased to a new starting value, which is itself increased over time. For example, as illustrated in FIG. 5, the data rate 502 may be increased to a local peak data rate 504, decreased to a local midpoint data rate 506, increased to another local peak data rate 508, decreased again to a local midpoint data rate 510, and so on until a local "optimum" data rate 512 value is obtained, which is below the current access point congestion value 514.

Figure 4:
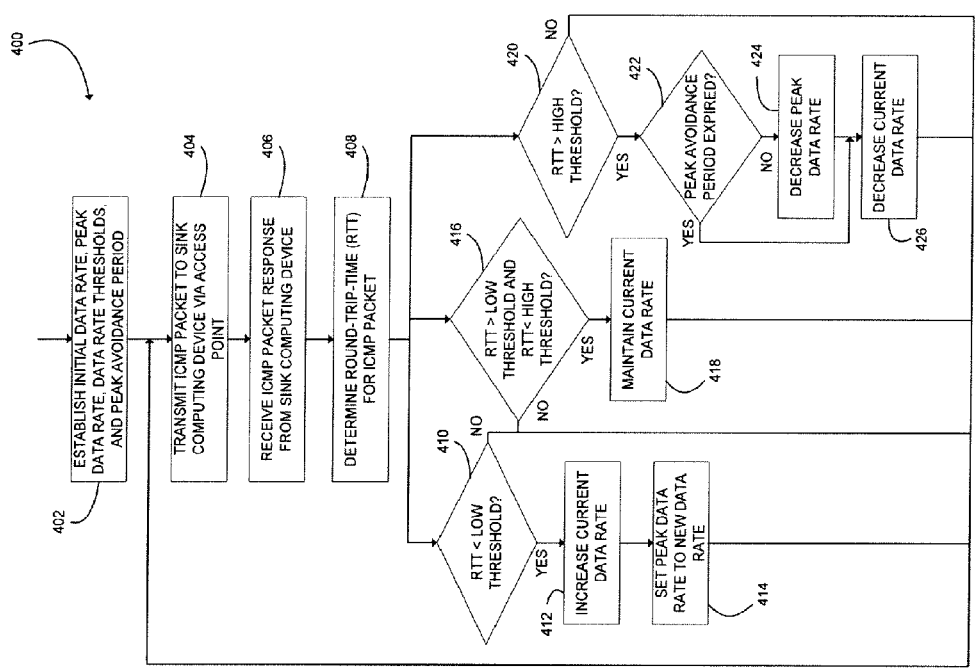
FIG. 4 is a simplified flow diagram of another embodiment of a method for detecting and reducing data transfer congestion in the access point of the network of FIG. 1.

Referring now to FIG. 4, in another embodiment, the source computing device 102 may execute a method 400 for detecting and reducing data transfer congestion in the access point 108 of the system 100. The method 400 may, for example, be executed in place of blocks 306 and 310 of the method 300 described above in regard to FIG. 3. The method 400 begins with block 402 in which the source computing device 102 establishes an initial or starting data rate, a peak or maximum data rate, data rate threshold values (see below in regard to blocks 410, 416, and 420), and a peak avoidance period. Similar to block 306, each of the initial data rate, peak data rate, threshold values, and peak avoidance period may be set to initial values in block 402. As discussed above, the initial data rate is the data rate at which the source computing device 102 will begin transmitting (e.g., multi-casting) data to the computing devices 110. The peak data rate is used to track the maximum data rate prior to data transfer congestion and to determine a new data rate as discussed below. The data rate threshold values are used to determine the level of network congestion and the responses thereto. The peak avoidance period defines the length of time during which the peak data rate is decreased if a high amount of network congestion is detected as discussed above in regard to block 320 of method 300.

In blocks 404-408, the source computing device 102 determines the round-trip-time value for an internet control message protocol (ICMP) packet transmitted to the sink computing device(s) 112. To do so, in block 404, the source computing device 102 transmits the internet control message protocol (ICMP) packet to the sink computing device(s) 112. In block 406, the source computing device 102 receives a response from the sink computing device(s) 112 in response to the internet control message protocol (ICMP) packet. The source computing device 102 determines the round-trip-time value in block 408 by measuring the elapsed time between transmitting the internet control message protocol (ICMP) packet and receiving the response from the sink computing device(s) 112. Should no response be received from the sink computing device(s) 112 within a predetermined maximum time period, the round-trip-time value may be set to a maximum value.

Subsequently, in blocks 410, 416, and 420, the source computing device 102 compares the round-trip-time value to multiple threshold values and performs one or more actions in response thereto. For example, in block 410, the source computing device 102 determines whether the measured round-trip-time value is less than a low threshold value, which may be selected to indicate low network congestion. If the round-trip-time value is less than the low threshold value, the current data rate is increased in block 412. That is, the data rate used by the source computing device 102 to transmit data to the computing devices 110 is increased in block 412. The current data rate may be increased linearly or non-linearly with respect to time. For example, in some embodiments, the data rate may be increased by a predetermined, fixed amount. Alternatively, the data rate may be exponentially increased over time. Additionally, in block 414, the peak data rate is set to the current data rate. In this way, the peak data rate tracks the current data rate during light data traffic congestion as discussed above in regard to FIGS. 3 and 5.

Referring back to block 416, if the measured round-trip-time value is greater than the low threshold value and less than the high threshold value, the source computing device 102 maintains the data rate at the current data rate and the peak data rate at its current value in block 418. However, if the source computing device 102 determines that the measured round-trip-time value is greater than the high threshold value in block 420, the method 400 advances to block 422. In block 422, the source computing device 102 determines whether the peak avoidance period has expired. If not, the peak data rate is decreased in block 424. To do so, the peak data rate may be decreased by a predetermined, fixed amount, a percentage amount, or other amount. In one particular embodiment, the peak data rate is decreased by about ten percent in block 424 (i.e., the new peak data rate is ninety percent of the current peak data rate). However, if the peak avoidance period has not expired, the method advances to block 426 and the peak data rate is not decreased. It should be appreciated that the peak avoidance period may be restarted periodically or in response to the peak data rate being maintained at the current rate for a predetermined period of time.

In block 426, the current data rate is also decreased. In some embodiments, the current data rate may be decreased by a fixed amount, a percentage value, or the like. In one particular embodiment, the current data rate is decreased to a midpoint data rate value between a previous starting value and the current peak data rate. To do so, the source computing device 102 may calculate a new midpoint data rate by summing the current peak data rate and a previously determined midpoint data rate, which may initially be set to zero or another initial value. The sum of the peak data rate and previous midpoint data rate is divided by two to determine the new midpoint data rate. The current data rate is set to the newly determined midpoint data rate, which is subsequently used as the previous midpoint data rate in subsequent calculations. In this way, the current data rate is decreased to a new starting value, which is itself increased over time as illustrated in FIG. 5 and discussed above in regard to FIG. 3. The method 400 subsequently loops back to block 404 to again measure the amount of congestion of the network and respond accordingly as discussed in detail above.

Although system 100 and methods 300, 400 have been described above as using internet control message protocol (ICMP) packets for detecting and reducing data transfer congestion, it should be appreciated that other communications protocols may be used in other embodiments. For example, in some embodiments other User Datagram Protocol (UDP) packets may be used by the source computing device 102 (or other computing device of the system 100) to determine and reduce the data transfer congestion of the access point 108 in a similar manner as discussed above.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A computing system comprising:
a processor; and
a memory device communicatively coupled to the processor, the memory device having stored therein a plurality of instructions, which when executed by the processor cause the processor to:
establish a peak data rate for data transmissions to at least one computing device of a plurality of computing devices via a wireless access point;
determine a round-trip-time value for a data packet transmitted to a first computing device of the plurality of computing devices;
determine whether the round-trip-time value is greater than a first threshold value;
determine, in response to a determination that the round-trip-time value is greater than the first threshold value, whether a predetermined peak avoidance period has expired; and
decrease the peak data rate in response to a determination that the predetermined peak avoidance period has not expired.

2. The computing system of claim 1, wherein the plurality of instructions, when executed by the processor, further cause the processor to:
establish a current data rate for data transmissions to the at least one computing device of the plurality of computing devices; and
decrease the current data rate to a value determined based on the decreased peak data rate in response to a determination that the round-trip-time value is greater than the first threshold value.

3. The computing system of claim 2, wherein to decrease the current data rate comprises to:
determine a new midpoint data rate value equal to half of the sum of the decreased peak data rate and a previously determined midpoint data rate value; and
set the current data rate to the new midpoint data rate value.

4. The computing system of claim 1, wherein the plurality of instructions, when executed by the processor, further cause the processor to:
 establish a current data rate for data transmissions to the at least one computing device of the plurality of computing devices;
 increase the current data rate in response to a determination that the round-trip-time value is less than a second threshold value; and
 set the peak data rate to the increased current data rate.

5. The computing system of claim 4, wherein the plurality of instructions, when executed by the processor, further cause the processor to:
 maintain the current data rate and the peak data rate in response to a determination that the round-trip-time value is less than the first threshold and greater than the second threshold.

6. A non-transitory machine readable storage medium comprising a plurality of instructions that, in response to execution, cause the source computing device to:
 establish a peak data rate for data transmissions from the source computing device to at least one computing device of a plurality of computing devices via a wireless access point;
 determine a round-trip-time value for a data packet transmitted from the source computing device to a first computing device of the plurality of computing devices;
 determine whether the round-trip-time value is greater than a first threshold value;
 determine, in response to a determination that the round-trip-time value is greater than the first threshold value, whether a predetermined peak avoidance period has expired; and
 decrease the peak data rate in response to a determination that the predetermined peak avoidance period has not expired.

7. The non-transitory machine readable storage medium of claim 6, wherein to determine the round-trip-time value for the data packet comprises to:
 transmit the data packet from the source computing device to the first computing device;
 receive a response from the first computing device in response to the transmitted data packet; and
 measure the time period between the transmitting and receiving steps.

8. The non-transitory machine readable storage medium of claim 6, wherein to determine the round-trip-time value for the data packet comprises to periodically determine the round-trip-time value for the data packet.

9. The non-transitory machine readable storage medium of claim 6, wherein to determine the round-trip-time value for the data packet comprises to determine the round-trip-time value for the data packet contemporaneously with transmitting data to the plurality of computing devices.

10. The non-transitory machine readable storage medium of claim 6, wherein to decrease the peak data rate comprises to decrease the peak data rate by a predetermined percentage.

11. The non-transitory machine readable storage medium of claim 10, wherein to decrease the peak data rate comprises to decrease the peak data rate by ten percent.

12. The non-transitory machine readable storage medium of claim 6, wherein the plurality of instructions, in response to execution, further cause the source computing device to:
 establish a current data rate for data transmissions from the source computing device to at least one computing device of the plurality of computing devices via the wireless access point;
 increase the current data rate in response to a determination that the round-trip-time value is less than a second threshold value; and
 set the peak data rate to the increased current data rate.

13. The non-transitory machine readable storage medium of claim 12, wherein to increase the current data rate comprises to linearly increase the current data rate by a predetermined amount.

14. The non-transitory machine readable storage medium of claim 12, wherein to increase the current data rate comprises to exponentially increase the current data rate.

15. The non-transitory machine readable storage medium of claim 12, wherein the plurality of instructions, in response to execution, further cause the source computing device to:
 decrease the current data to a value determined based on the decreased peak data rate in response to a determination that the round-trip-time value is greater than the first threshold value.

16. The non-transitory machine readable storage medium of claim 15, wherein to decrease the current data rate comprises to:
 determine a new midpoint data rate value equal to half of the sum of the decreased peak data rate and a previously determined midpoint data rate value; and
 set the current data rate to the new midpoint data rate value.

17. The non-transitory machine readable storage medium of claim 12, wherein the first threshold value is substantially equal to the second threshold value.

18. The non-transitory machine readable storage medium of claim 12, wherein the plurality of instructions, in response to execution, further cause the source computing device to:
 maintain the current data rate and the peak data rate in response to a determination that the round-trip-time value is less than the first threshold and greater than the second threshold.

19. A method comprising:
 establishing a peak data rate for data transmissions from a source computing device to at least one computing device of a plurality of computing devices via a wireless access point;
 determining a round-trip-time value for a data packet transmitted from the source computing device to a first computing device of the plurality of computing devices;
 determine whether the round-trip-time value is greater than a first threshold value;
 determine, in response to a determination that the round-trip-time value is greater than the first threshold value, whether a predetermined peak avoidance period has expired; and
 in response to a determination that the predetermined peak avoidance period has not expired, decreasing the peak data rate.

20. The method of claim 19, further comprising:
 establishing a current data rate for data transmissions to the at least one computing device of the plurality of computing devices; and
 decreasing the current data rate to a value determined based on the decreased peak data rate in response to determining that the round-trip-time value is greater than the first threshold value.

21. The method of claim 19, further comprising:
- establishing a current data rate for data transmissions to the at least one computing device of the plurality of computing devices;
- increasing the current data rate in response to determining that the round-trip-time value is less than a second threshold value; and
- setting the peak data rate to the increased current data rate.

22. The computing system of claim 1, wherein the plurality of instructions, when executed by the processor, further cause the processor to:
- determine whether the peak data rate has not changed for a predefined duration; and
- restart the peak avoidance period in response to a determination that the peak data rate has not changed for the predefined duration.

23. The machine readable storage medium of claim 6, wherein the plurality of instructions, in response to execution, further cause the source computing device to:
- determine whether the peak data rate has not changed for a predefined duration; and
- restart the peak avoidance period in response to a determination that the peak data rate has not changed for the predefined duration.

\* \* \* \* \*